United States Patent [19]

Cornwall et al.

[11] Patent Number: 4,522,425
[45] Date of Patent: Jun. 11, 1985

[54] TWO WHEEL TRAILER

[76] Inventors: Harry J. Cornwall, 6275 E. Sixth St., Long Beach, Calif. 90803; Daniel E. Hanebrink, 304 Riverside Ave., Sugarloaf, Calif. 92386

[21] Appl. No.: 447,617

[22] Filed: Dec. 7, 1982

[51] Int. Cl.³ .............................................. B62B 5/00
[52] U.S. Cl. ................................... 280/656; 280/639; 280/701
[58] Field of Search .................... 280/656, 38, 40, 701, 280/401, 639, 646, 690; 267/140, 153

[56] References Cited

U.S. PATENT DOCUMENTS

| Re. 20,292 | 3/1937 | Brown | 280/33.4 |
|---|---|---|---|
| 1,443,594 | 1/1923 | Saives | 414/499 |
| 1,569,498 | 1/1926 | Jousset et al. | 280/400 |
| 1,844,003 | 2/1932 | Brown | 280/401 |
| 2,034,842 | 3/1936 | Stratton | 280/401 |
| 2,080,709 | 5/1937 | Hall et al. | 280/33.4 |
| 2,110,944 | 3/1938 | Schultz | 280/33.4 |
| 2,490,014 | 12/1949 | Brand | 280/639 X |
| 3,649,041 | 3/1972 | Cervantex | 280/32.5 |
| 3,797,597 | 3/1974 | Young | 280/639 X |
| 3,810,662 | 5/1974 | Commanda | 280/415 R |
| 3,935,606 | 2/1976 | Soot | 280/701 X |
| 4,175,768 | 11/1979 | Thackray | 280/656 X |
| 4,191,260 | 3/1980 | Klindworth | 172/311 |
| 4,230,340 | 10/1980 | Wasservogel | 280/656 |
| 4,453,735 | 6/1984 | Penverne et al. | 280/701 X |

FOREIGN PATENT DOCUMENTS 1593646  7/1981  United Kingdom ................ 280/639

Primary Examiner—Joseph F. Peters, Jr.
Assistant Examiner—Michael Mar
Attorney, Agent, or Firm—Fulwider, Patton, Rieber, Lee & Utecht

[57] ABSTRACT

A two wheel trailer comprising a trailer body having a deck and a pair of vertically oriented side portions which mount trunnions carrying the suspension arms of a pair of wheels. Locking mechanisms are actuable to permit downward and inward rotation of the trunnions to locate the wheels beneath the upper deck of the trailer body in a compact, recessed relation. Combined spring and shock absorber devices are carried by the trailer body for engagement with the suspension arms. An elongated towing tongue is telescopable within the trailer body. In a preferred embodiment the trailer body includes two hinged together sections, the rearward section mounting the tail lights being pivotable to underlie and enclose the retracted wheels located within the forward section. The folded sections are designed to fit within the trunk of a typical passenger vehicle.

10 Claims, 12 Drawing Figures

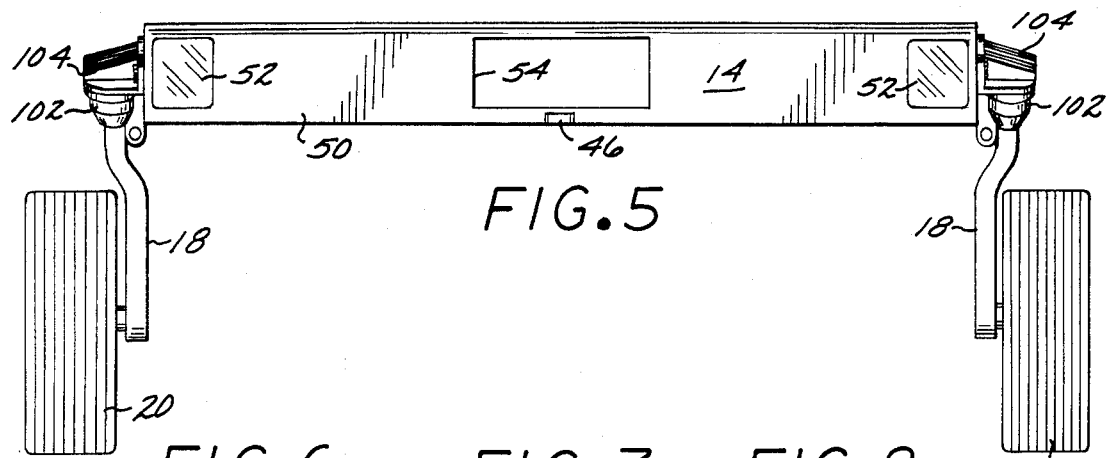
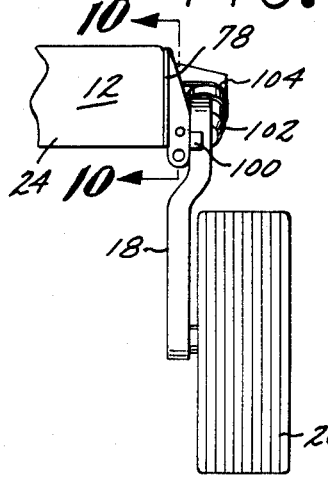
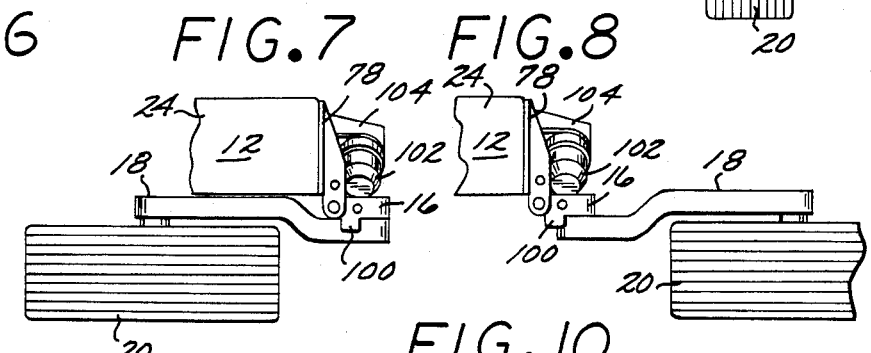
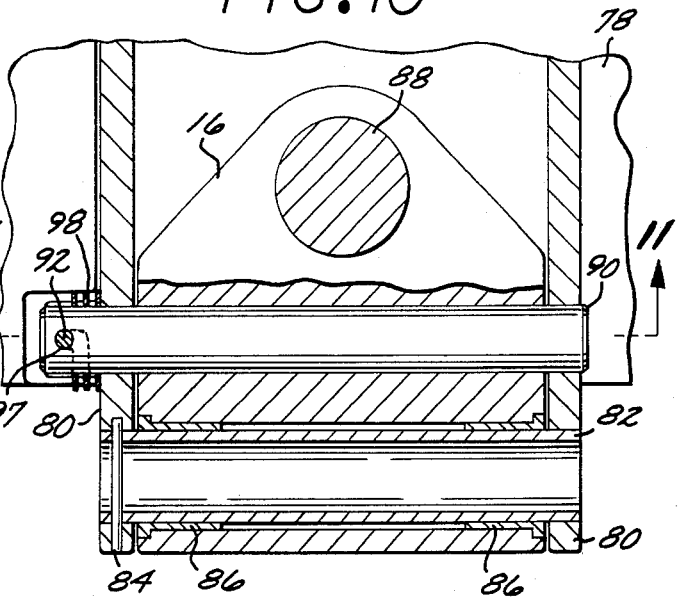
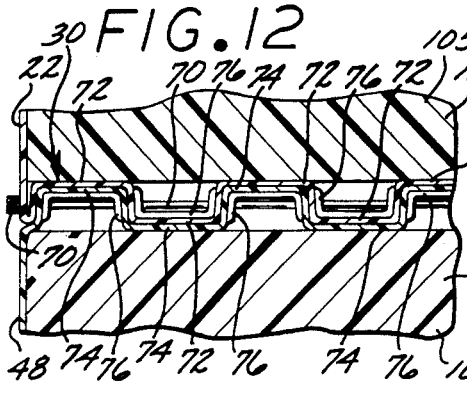
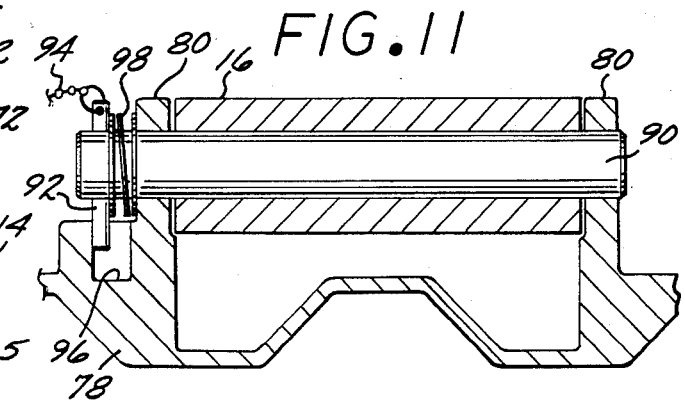

TWO WHEEL TRAILER

BACKGROUND OF THE INVENTION

The present invention relates to two wheel trailers and more particularly to two wheel trailers whose component parts can be arranged in compact form to fit within a passenger vehicle trunk space.

DESCRIPTION OF THE PRIOR ART

The average individual has only infrequent need for a trailer and customarily will rent a trailer for transporting extra luggage, household goods, gardening supplies, or building materials, for example. This involves inconvenience and expense since a suitable trailer must first be located, and then it must be returned as soon as possible to minimize the rental expense.

It would be desirable for an individual to be able to purchase a relatively inexpensive two wheel trailer whose component parts could easily be fitted together for use, and just as readily be retracted or disassembled to provide a compact package small and light enough to be carried in a passenger vehicle, and particularly within the usual trunk space.

SUMMARY OF THE INVENTION

According to the present invention, a two wheel trailer is provided having component parts which can be interfitted in a small package for storage in an automobile trunk, and which can be easily and quickly assembled, unfolded or extended for transporting goods and materials.

The trailer comprises a body having a deck and a pair of vertical oriented side portions or trunnion supports which mount vertically oriented trunnions unlockable for pivotable movement about a pair of longitudinal pivot axes. A pair of suspension arms mounted to the trunnions carry the wheels which support the trailer, the arms being normally constrained against unlimited rearward pivotal movement by shock absorbing means. These means are located on the trailer side portions and serve not only as shock absorbers but also as suspension springs through cooperation with the suspension arms.

The locking means which normally prevent pivotal movement of the trunnions are unlockable to permit pivotal movement of the trunnions downwardly and inwardly of the side portions for location of the wheels inwardly of the side portions and beneath the trailer deck.

The trailer includes a trailer tongue adapted to telescopably fit within the trailer body for storage. In addition, the trailer body preferably comprises pivotally connected front and rear sections, the front section being adapted to house the telescopable towing tongue and the wheels, and the rear section being adapted to mount the tail lights and usual license plate. The sections are normally locked together but can be released to permit the rear section to pivot into a position underlying the forward section, thereby forming a closed container or enclosure adapted to fit within the trunk storage space of a typical passenger vehicle, much like an oversize suitcase.

Other objects and features of the invention will become apparent from consideration of the following description taken in connection with the accompanying drawings.

BRIEF DESCRIPTION OF THE DRAWINGS

FIG. 5 is a rear elevational view of the trailer of FIG. 2;

FIG. 6 is a detailed front elevational view of a side portion of the trailer, including the associated trunnion, suspension arm and wheel as they would appear in their deployed or operative state;

FIGS. 7, 8 and 9 are views similar to FIG. 6, and illustrating one sequence of steps for manipulating each trunnion and trailing arm to locate the associated wheel inwardly of the trailer side portion and beneath the trailer deck, FIG. 7 illustrating the trunnion pivoted to a horizontal position, FIG. 8 illustrating the suspension arm rotated upon its associated, horizontally oriented trunnion, and FIG. 9 illustrating the downward and inwardly pivoted positions of the trunnion, suspension arm and wheel beneath the trailer deck;

FIG. 10 is an enlarged view taken along the line 10—10 of FIG. 6;

FIG. 11 is a view taken along the line 11—11 of FIG. 10; and

FIG. 12 is a view taken along the line 12—12 of FIG. 3.

DESCRIPTION OF THE PREFERRED EMBODIMENT

Figure 2:
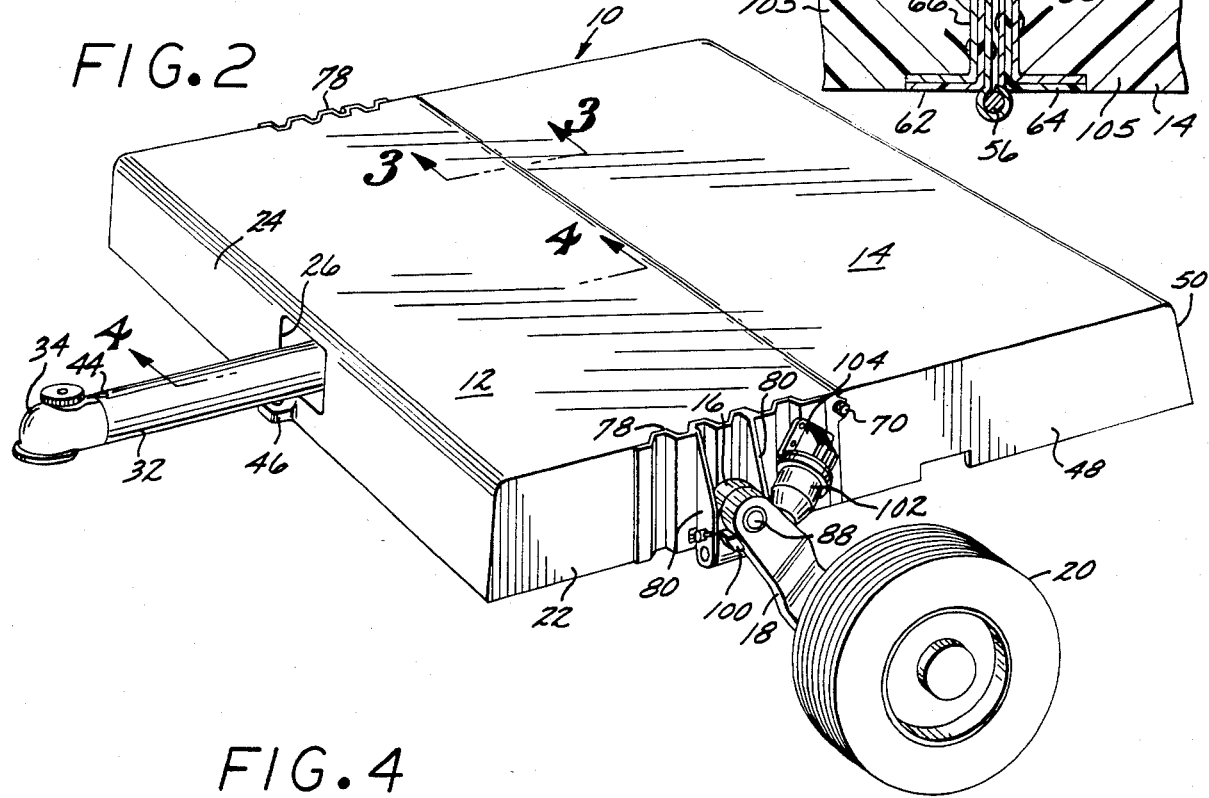
FIG. 2 is a perspective view of the trailer of FIG. 1 in its unfolded operative state.

Referring now to the drawings, and particularly to FIG. 2, there is illustrated a two wheel trailer 10 according to the present invention and comprising, generally rectangular forward and rearward shells or sections 12 and 14 which are pivotally connected together to define a continuous horizontal deck and vertical sides which support a pair of trunnions 16. The trunnions 16 mount a pair of suspension arms 18 which rotatably carry a pair of wheels 20, respectively.

The forward and rearward sections 12 and 14 are preferably made of light weight material, such as metal, plastic or a metal-plastic combination, the plastic being one of the readily commercially available, inexpensive plastic materials characterized by high strength, corrosion resistance and durability. Although not illustrated, the structure of the sections 12 and 14 may be suitably reinforced by integral strengthening channels, ribs and the like, if desired, but in the present embodiment structural rigidity is provided by filling unused internal spaces with suitable plastic foam material.

Figure 4:
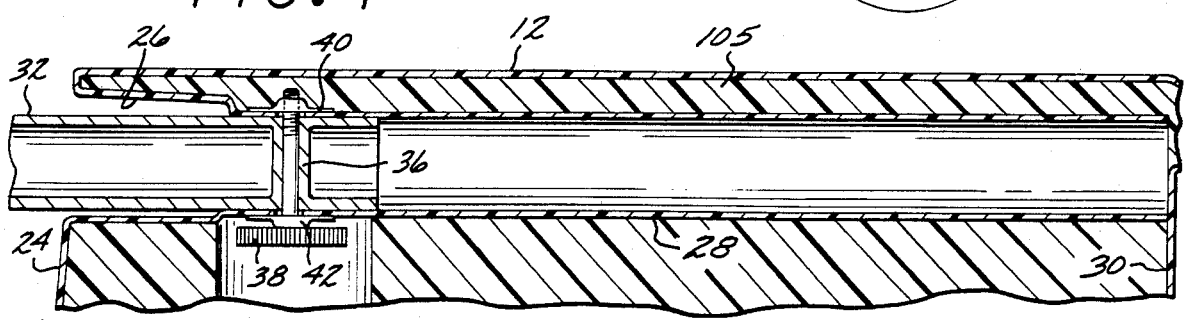
FIG. 4 is an enlarged view taken along the line 4—4 of FIG. 2.

As seen in FIG. 2, the forward section 12 includes a pair of laterally spaced apart side walls 22 and a front wall 24. As best seen in FIG. 4, the central portion of the wall 24 is formed to define a forwardly open, generally rectangular recess or receptacle 26. The rearward extremity of the receptacle 26 is joined to and opens into the forward end of a longitudinally extending cylinder 28 which is supported at its rearward extremity by a rear wall 30 of the forward section 12.

An elongated towing bar or tongue 32 of tubular cross-section, and mounting the usual towing fitting 34 for connection to a vehicle mounted towing hitch (not shown), is carried within the receptacle 26. More particularly, the rearward extremity of the tongue 32 includes an integral, vertically oriented transverse bushing 36 adapted to receive the shank of a locking member 38. The shank normally projects through the bushing 36 and also through cap nuts 40 and 42 which are fixed to the upper and lower surfaces of the cylinder 28. One extremity of the shank is threaded into the cap nut 40, which is also threaded, thereby securing the towing tongue 32 in the operative position shown in FIGS. 2 and 4.

Figure 1:
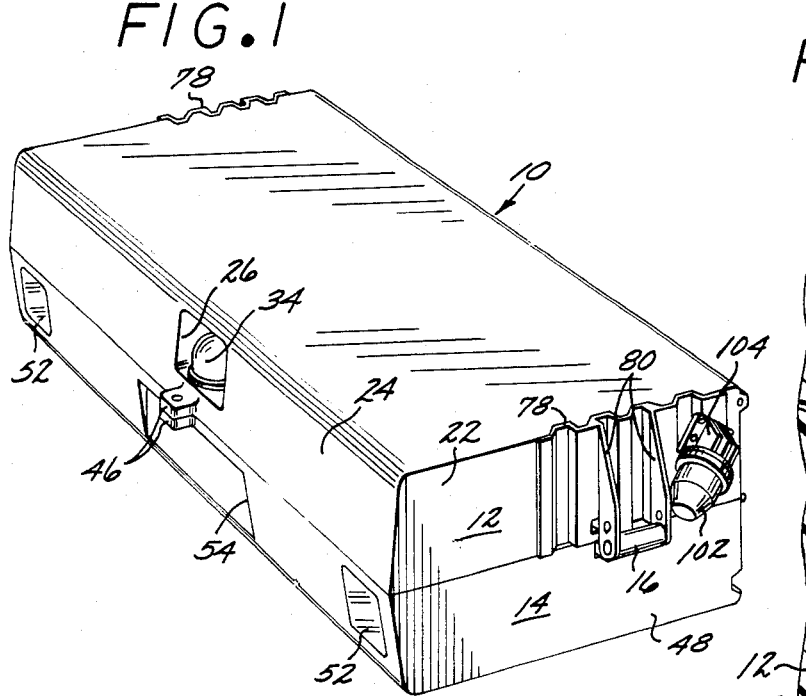
FIG. 1 is a perspective view of the present two wheel trailer as it would appear in its folded storage state.

The locking member 38 is easily removable from this operative position by rotating a knurled head of the member 38. After the unthreaded member 38 is removed, the tongue 38 can be telescopably retracted into the cylinder 28, with the towing fitting 34 being retracted or housed within the receptacle 26, as best seen in FIG. 1. The tongue 32 can be maintained in this retracted position by reinserting the locking member 38 through a more forwardly located transverse bushing (not shown) whose upper opening 44 can be seen in FIG. 2.

As seen in FIG. 1, both sections 12 and 14 include apertured tabs 46 to permit the sections to be locked or securely held together in their folded, storage positions.

The rearward section 14 includes transversely spaced apart side walls 48 constituting rearward extensions of the front section side walls 22 in the operative position of the trailer, as seen in FIG. 2. The section 14 also includes a rear wall 50 having suitable recesses and fasteners (not shown) for mounting a pair of usual taillights 52 and a usual license plate in a rectangular recess 54.

A front wall 54 of the rearward section 14 is pressed against the forward section rear wall 30 when the section 14 is pivoted into the operative position illustrated in FIG. 2. This capability for pivotal movement is provided by a transverse piano hinge fitting having a transverse pivot pin 56 extending along the lower edges of the walls 30 and 54. The pin 56 is disposed through usual hinge knuckles integral with a pair of hinge plates 58 and 60 fixed by rivets or the like to walls 30 and 54, respectively. The walls are inwardly offset as illustrated to accommodate the extra thickness of the hinge plates 58 and 60.

The lower extremities of the walls 30 and 34 include oppositely extending, horizontally oriented flanges 62 and 64, respectively, to which are attached the horizontal legs of a pair of transversely oriented reinforcing angles 66 and 68. The vertical legs of the angles 66 and 68 are riveted to adjacent vertical portions of the walls 30 and 54. This arrangement provides structural rigidity to accommodate the loads imparted upon the forward and rearward sections 12 and 14 during folding and unfolding of the sections.

When the sections 12 and 14 are folded outwardly into the operative position of FIG. 2, they are held in this operative position by a transversely extending lock pin 70. The pin 70 passes through a plurality of alternately offset box sections 72 formed in the upper extremity of the front section rearwall 30, and through a corresponding plurality of complemental box sections 74 formed in the upper extremity of the rear section front wall 54. The box sections 72 and 74 are internested, as illustrated in FIG. 12, to provide proper alignment of the sections 12 and 14, and to constrain them from relative lateral movement. In addition, a plurality of channel shape reinforcing elements 76 are fixed by any suitable means within the respective box sections to receive the lock pin 70 and structurally rigidify the interconnection.

Further structural rigidity is provided by filling the unoccupied or unused internal spaces of the sections 12 and 14 with foam-in-place plastic foam material 105, leaving spaces or wells for the wheels 20 and associated components.

Figure 3:
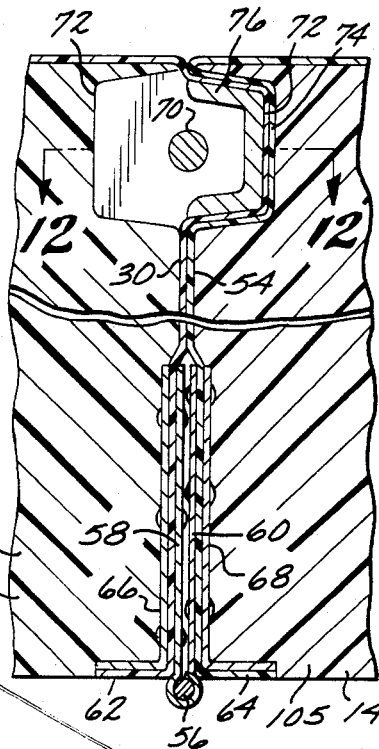
FIG. 3 is an enlarged view taken along the line 3—3 of FIG. 2.

The section 14 is easily moved from the position of FIG. 2 to that of FIG. 1 by simply removing the pin 70 and pivoting the section 14 about the axis of the pivot pin 56 shown in FIG. 3.

The forward section side walls 22 include side portions or trunnion supports 78 which are bolted or otherwise rigidly secured to the walls. Each support 78 is preferably made of forged aluminum or other strong and lightweight material, and includes vertically oriented channels to provide structural rigidity. Each support 78 also includes a pair of longitudinally spaced apart, vertically oriented, and laterally projecting mounting cheeks or brackets 80 having confronting openings at their lower extremities. The openings receive a pivot tube 82 which, as seen in FIG. 10, is fixed in position by means of a usual and conventional roll pin 84 extending through one end of the tube 82 and into adjacent portions of the associated mounting bracket 80.

Each trunnion 16 is generally vertically oriented and its lower extremity includes a longitudinally extending passage which is counterbored at its opposite extremities to receive and seat a pair of bushings 86 made of a low friction material such as tetrafluoroethylene, the bushings 86 and trunnion 16 thereby being pivotable about the axis of the tube 82 during retraction of the associated wheel 20, as will be seen.

The upper extremity of each trunnion 16 includes a transverse opening which fixedly receives the inner end of a stub shaft 88 whose outer end pivotally mounts the upper extremity of the associated suspension arm 18, as best seen in FIGS. 2 and 10.

Each trunnion 16 is normally constrained by a locking pin 90 against downward pivotal movement about the longitudinal axis of the associated tube 82. The pin 90 extends through a suitable bore in the mid-portion of the trunnion 16 and at its extremities extends through suitable openings provided in the confronting mounting brackets 80, as best seen in FIG. 10.

The locking pin 90 is constrained against removal by an elongated retainer pin 92, as best seen in FIGS. 10 and 11 which extends through a suitable transverse opening in one extremity of the locking pin 90. The upper end of the retainer pin 92 mounts one end of a pin retainer chain 94 whose opposite end is secured to some other part of the trailer 10 to prevent its loss. The other end of the retainer pin 92 extends into an arcuate recess 96 provided in an adjacent portion of the trunnion support 78, the recess 96 being characterized by a lateral detent portion 97 into which the pin 92 is urged by a leaf compression spring 98 disposed about the locking pin 90 between the pin 92 and the adjacent bracket 80.

In order to pivot the trunnion 16 downwardly, the locking pin 90 is urged inwardly or to the right, as viewed in FIGS. 10 and 11, to move the pin 92 out of the detent portion 97, whereupon the lower extremity of the retainer pin 92 is free to rotate within the recess 96 and free the trunnion 16 for rotation.

As best seen in FIG. 2, a laterally projecting stop 100 is carried upon the outer face of each trunnion 16. The stop 100 is preferably made immovable and integral with the trunnion 16 but, if desired, it can be made in the form of an outwardly biased button which is depressable into a suitable recess in the trunnion 16 to permit forward pivotal movement of the suspension arm 18 relative to the trunnion 16. In the preferred embodiment the fixed stop 100 prevents forward pivotal movement of the arm 18 which, as will be seen, requires a certain sequence of actions to enable recessing of the associated wheel 20 below the trailer deck.

A shock absorber 102 is provided for each suspension arm 18 to take up shock loads on the wheel 20. Each shock absorber 20 is attached to a suspension mount 104 which is fixed to the adjacent trunnion support 78. Although any suitable shock absorber may be utilized, including a simple block of resilient elastomeric material such as rubber, it is preferred to use a cylindrical element known in the trade as a "Marsh Mellow" spring, a product of the Firestone Tire & Rubber Co. of Akron, Ohio. This spring or shock absorber comprises a solid rubber core wrapped with multiple plies of bonded tire cord and, in the shock absorber 102, is forwardly and downwardly inclined, terminating in a conical extremity adapted to bear against a complementally configured centering cone (not shown) located on the rearward edge of the associated suspension arm 18. The shock absorber 102 is an important feature of the present invention, combining the functions of suspension spring and shock absorber in one compact, lightweight and low maintenance package. The complexities and expense of usual trailer leaf or coil spring suspensions are eliminated, as well as the problems associated with separate conventional hydraulic shock absorbers. By arranging the shock absorber 102 adjacent its associated suspension arm 18, the absorber 102 is adapted to engage the arm 18 to accomplish both the spring and shock absorber functions.

Operation of the two wheel trailer 10 is much like any other trailer in that it is attached to a towing vehicle and rides upon its wheels 20 to support loads placed upon the flat upper portion or deck of the sections 12 and 14. Although not shown, suitable recesses for the usual stakes of stake sections may also be provided about the trailer periphery to better contain bulky loads. Further, suitable slots can be provided to accept usual holding straps or like devices (not shown).

When the trailer is to be folded for storage in a passenger vehicle trunk, the towing tongue 32 is unhitched and telescoped into cylinder 28, being held in this position by relocating the locking member 38 from the position illustrated in FIG. 4 to a position in which it projects through the bushing associated with the opening 44 and into the threaded cap nut 40.

Next, the locking pins 90 are pushed inwardly to move the retainer pins 92 out of their detent portions 97, permitting outward pivotal movement of the trunnions 16 to the position shown in FIG. 7. If a depressible stop 10 had been used rather than the fixed or immovable stop 100, the stop could at this point be depressed to allow forward pivotal movement of the suspension arm 18 to orient it generally transversely. The wheels 20 could then be received in the rearward section 14 when it was folded or pivoted to underlie the section 12.

In the preferred embodiment the immovable stop 100 prevents the arm 18 from being pivoted in the way just described. Instead, the arm 18 is oppositely pivoted until it projects laterally outwardly, as illustrated in FIG. 8. The arm 18 and the trunnion 16 can then be pivoted in a transverse path to underlie the upper wall or deck of the forward section 12, as illustrated in FIG. 9.

Once the wheels 20 are retracted or recessed, the lock pin 70 is removed and the rearward section 14 is pivoted about the axis of the pivot pin 56 into the position illustrated in FIG. 1. In this configuration the folded sections 12 and 14 can easily be lifted and placed within a conventional passenger vehicle trunk. In one suitable configuration the folded unit weighs approximately 70 pounds, and has a width of approximately 52 inches, a length of 26 inches, and a height of 12 inches.

A less convenient but also less expensive wheel demounting system can be provided which eliminates pivotal inward movement of the suspension arms 18 and wheels 20. Such a system could employ a suspension arm pivotable only about the axis of the associated shaft 88, and employ a retaining nut (not shown) on the end of the shaft 88. Removal of the retaining nut would permit axial slidable removal of the suspension arm 18 from the shaft 88, and subsequent manual placement of the arms 18 and wheels 20 within one or the other of the sections 12 and 14.

Various modifications and changes may be made with regard to the foregoing detailed description within departing from the spirit of the invention.

I claim:

1. A two wheel trailer comprising:
   a trailer body including adjacent forward and rearward sections which in their operative positions define, respectively, downwardly opening forward and rearward compartments, said forward and rearward sections being hingedly connected together for pivotal movement of said rearward section about a transverse axis into a storage position underlying said forward section;
   a pair of suspension arms normally located in an outer position outwardly of the sides of said forward section, respectively, for pivotal movement about transverse pivot axes;
   shock absorbing means carried by said sides of said forward section, respectively, and engageable with said suspension arms;
   a pair of wheels carried by said suspension arms, respectively,
   support means carried by the sides of said forward section for mounting said suspension arms, said support means being operative to enable said wheels and said suspension arms to be pivoted from said outer position to a retracted position within said forward compartment whereby, upon location of said rearward section in said storage position, substantially all of said suspension arms and all of said wheels are completely enclosed by said forward and rearward sections and locking means normally maintaining said suspension arms in said outer position but selectively operable to enable said suspension arms to move to said retracted position.

2. A two wheel trailer according to claim 1 wherein said shock absorbing means comprises a pair of unitary, cylindrical elements made of elastomeric material.

3. A two wheel trailer comprising:
   a trailer body having storage recesses and side portions;
   a pair of trunnions mounted to said side portions, respectively, for pivotal movement about a pair of longitudinal pivot axes;

a pair of suspension arms mounted to said trunnions, respectively, for pivotal movement about transverse pivot axes;

shock absorbing means carried by said side portions, respectively, and engageable with said suspensions arms;

a pair of wheels carried by said suspension arms, respectively; and locking means normally preventing but selectively operable to permit said suspension arms to be moved out of engagement with said shock absorbing means and to permit pivotal movement of said trunnions about said longitudinal pivot axes whereby said trunnions may be pivoted to locate said suspension arms and said wheels inwardly of said side portions and within said storage recesses.

4. A two wheel trailer according to claim 3 and including stops on said trunnions, respectively, limiting pivotal movement of said suspension arms about said transverse pivot axes in a direction away from said shock absorbing means.

5. A two wheel trailer according to claim 3 wherein said trunnions are vertically elongated and mounted externally of said side portions, the lower extremities of said trunnions being mounted to said side portions, and the upper extremities of said trunnions pivotally mounting said suspension arms whereby, upon downward and inward pivotal movement of said trunnions about said longitudinal pivot axes, said upper extremities, said suspension arms and said wheels are disposed inwardly of said side portions.

6. A two wheel trailer comprising:
a trailer body having a deck and side portions;
a pair of vertically oriented trunnions located exteriorly of said side portions and mounted at their lower extremities, respectively, to the lower extremities of said side portions for pivotal movement about a pair of longitudinal pivot axes;
a pair of elongated suspension arms mounted at their upper extremities, respectively, to the upper extremities of said trunnions for pivotal movement about transverse pivot axes;
shock absorbing means carried by said side portions rearwardly of said suspension arms, respectively, and normally engageable with said suspension arms to resiliently limit the degree of rearward pivotal movement of said suspension arms about said transverse pivot axes;
a pair of wheels located on said suspension arms and rotatably carried at the lower extremities of said suspension arms, respectively; and
locking means normally preventing said pivotal movement of said trunnions about said longitudinal pivot axes, and selectively operable to permit said pivotal movement whereby said trunnions may be pivoted downwardly and inwardly of said side portions to permit location of said wheels inwardly of said side portions and beneath said deck.

7. A two wheel trailer according to claim 6 and including stops on said trunnions, respectively, limiting forward pivotal movement of said suspension arms about said transverse axes.

8. A two wheel trailer comprising:
a trailer body having storage recesses and a pair of side portions;
a pair of vertically oriented trunnions located exteriorly of said side portions and mounted at their lower extremities, respectively, to the lower extremities of said side portions for pivotal movement of said trunnions about a pair of longitudinal pivot axes;
a pair of elongated suspension arms located exteriorly of said side portions and mounted at their upper extremities, respectively, to the upper extremities of said trunnions for pivotal movement of said suspension arms about transverse pivot axes;
shock absorbing means carried by said side portions rearwardly of said suspension arms, respectively, and normally engageable with said suspension arms to resiliently limit the degree of rearward pivotal movement of said suspension arms about said transverse pivot axes;
a pair of wheels located exteriorly of said suspension arms and rotatably carried at the lower extremities of said suspension arms, respectively;
stops on said trunnions, respectively, engageable by said suspension arms to limit the degree of forward pivotal movement of said suspension arms about said transverse axes; and
locking means normally preventing said pivotal movement of said trunnions about said longitudinal pivot axes, and selectively operable to permit said pivotal movement whereby said upper extremities of said trunnions may be pivoted downwardly and outwardly of said side portions to locate said wheels inwardly of said side portions and below said suspension arms, whereby said suspension arms may thereafter be pivoted rearwardly and outwardly, and whereby said suspension arms may thereafter be pivoted inwardly to located said trunnions, said suspension arms and said wheels inwardly of said side portions, with said wheels located upwardly of said suspension arms and within said storage recesses.

9. A two wheel trailer according to claim 8 wherein said shock absorbing means comprises a pair of unitary, cylindrical elements made of elastomeric material.

10. A two wheel trailer according to claim 8 wherein said trailer body comprises a pair of sections connected together for pivotal movement of one of said sections along a transverse axis into underlying relation relative to the other of said sections for enclosing said wheels within said storage recesses.

* * * * *